US008055106B2

(12) United States Patent
Han et al.

(10) Patent No.: US 8,055,106 B2
(45) Date of Patent: Nov. 8, 2011

(54) OPTICAL COMMUNICATION DEVICE INCLUDING A DIGITAL OPTICAL SWITCH

(75) Inventors: Young-Tak Han, Daejeon (KR); Jang Uk Shin, Daejeon (KR); Sang-Pil Han, Daejeon (KR); Sang Ho Park, Daejeon (KR); Yongsoon Baek, Daejeong (KR)

(73) Assignee: Electronics and Telecommunications Research Institute (KR)

( * ) Notice: Subject to any disclaimer, the term of this patent is extended or adjusted under 35 U.S.C. 154(b) by 166 days.

(21) Appl. No.: 12/463,032

(22) Filed: May 8, 2009

(65) Prior Publication Data

US 2010/0142884 A1   Jun. 10, 2010

(30) Foreign Application Priority Data

Dec. 10, 2008 (KR) .......................... 10-2008-0125319

(51) Int. Cl.
 *G02B 6/26* (2006.01)
(52) U.S. Cl. ................ 385/22; 385/14; 385/16
(58) Field of Classification Search .................... 385/14, 385/16–17, 22, 28, 29, 43, 140
See application file for complete search history.

(56) References Cited

U.S. PATENT DOCUMENTS

| | | | | |
|---|---|---|---|---|
| 4,753,505 A * | 6/1988 | Mikami et al. | ...................... | 385/5 |
| 5,173,956 A * | 12/1992 | Hayes | ............................ | 385/16 |
| 5,911,018 A * | 6/1999 | Bischel et al. | .................. | 385/16 |
| 6,072,924 A * | 6/2000 | Sato et al. | ........................ | 385/18 |
| 6,236,774 B1 * | 5/2001 | Lackritz et al. | ................. | 385/14 |
| 6,356,679 B1 * | 3/2002 | Kapany | ............................ | 385/18 |
| 6,546,163 B2 * | 4/2003 | Thackara | ......................... | 385/18 |
| 6,556,734 B1 * | 4/2003 | Bischel et al. | .................. | 385/14 |
| 6,868,222 B2 * | 3/2005 | DePue et al. | ..................... | 385/140 |
| 7,103,244 B2 * | 9/2006 | Chen et al. | ....................... | 385/24 |
| 7,151,868 B1 * | 12/2006 | Wang | .............................. | 385/16 |
| 7,203,411 B1 | 4/2007 | Jiang et al. | | |
| 2005/0185890 A1 | 8/2005 | Eldada | | |
| 2006/0153499 A1 | 7/2006 | Eldada | | |

FOREIGN PATENT DOCUMENTS

| | | |
|---|---|---|
| JP | 2007-0524863 T | 8/2007 |
| KR | 2000-0014362 | 3/2000 |
| KR | 2002-0028551 | 4/2002 |

OTHER PUBLICATIONS

Y.O. Noh et al., "PLC-type variable optical attenuator operated at low electrical power", Electronics Letters, vol. 36, No. 24, pp. 2032-2033.
Y.-O. Noh et al., "Polymer waveguide thermo-optic switches with-70 dB optical crosstalk", Optics Communication, vol. 258, pp. 18-22.

* cited by examiner

*Primary Examiner* — Ellen Kim
(74) *Attorney, Agent, or Firm* — Rabin & Berdo, PC (57) ABSTRACT

An optical communication device provided with digital optical switching includes a substrate; and at least one optical switch including a first optical switch composed of a main core disposed on the substrate and extending along a first direction, the main core including an optical input part and a transmission output part sequentially arranged along the first direction; a heater extending along a second direction to cross the main core; and a reflection output part extending along a third direction from a central point of the main core. The first direction and the second direction define a first angle there between, the second direction and the third direction define a second angle there between, and the first angle is equal to the second angle. An optical signal is outputted through the reflection output part or the transmission output part in response to heat from operation of the heater.

14 Claims, 6 Drawing Sheets

OPTICAL COMMUNICATION DEVICE INCLUDING A DIGITAL OPTICAL SWITCH

CROSS-REFERENCE TO RELATED APPLICATIONS

This U.S. non-provisional patent application claims priority under 35 U.S.C. §119 of Korean Patent Application No. 10-2008-0125319, filed on Dec. 10, 2008, the entire contents of which are hereby incorporated by reference.

BACKGROUND OF THE INVENTION

The present invention disclosed herein relates to an optical communication device, and more particularly, to an optical communication device having a digital optical switch.

In recent, large capacity, high-speed, and high performance of an optical communication device are increasingly required. For example, examples of the optical communication system may include an optical communication system using a wavelength division multiplexing (WDM) method and an optical communication system using a reconfigurable optical add-drop multiplexer (ROADM) method. For example, in the optical communication system using the ROADM method, since several channels are connected to each other at the same time, utilization of a network can be improved, costs can be reduced, and a network structure can be simplified.

Optical switches are one of important elements constituting optical communication systems. An optical attenuator is well-known as an example of the optical switches. The optical attenuator is an optical device that adjusts an attenuation degree of an optical signal at the outside. For example, intensity of the optical signal may be attenuated through the optical attenuator by the external adjustment, or the intensity of the optical signal may not be changed.

However, as an optical communication industry is developed, the optical communication system may require optical switches having various functions. Thus, a lot of research with respect to the optical switches that can perform novel functions is being developed.

SUMMARY OF THE INVENTION

Embodiments of the present invention provide optical communication devices include a main core disposed on a substrate and extending along a first direction, the main core comprising an optical input part and a transmission output part sequentially arranged along the first direction; a heater extending along a second direction to cross the main core; and a reflection output part extending along a third direction from a central point of the main core, wherein a first angle between the first direction and the second direction is equal to a second angle between the second direction and the third direction.

In some embodiments, the main core may include a first portion receiving the heat and a second portion that does not receive the heat when heat is supplied by the heater. At this time, the first portion may have a refractive index lower than that of the second portion, and a reflective surface parallel to the second direction may be generated at a boundary between the first portion and the second portion. When the heater does not operate, the first portion of the main core may have the same refractive index as the second portion of the main core.

In other embodiments, the reflection output part may be spaced from the main core.

In still other embodiments, the heater may be spaced from the central point of the main core along a fourth direction. The fourth direction may be perpendicular to the second direction and be away from the reflection output part.

In even other embodiments, the optical communication devices may further include a cladding surrounding the main core and the reflection output part. The cladding may be disposed between the heater and the main core.

In yet other embodiments, the optical communication devices may further include: a first single mode core in which an optical signal is incident; a first taper core disposed between the first single mode core and the optical input part, the first taper core being connected to the first single mode core and the optical input part; a second single mode core to which an optical signal via the transmission output part is outputted; and a second taper core disposed between the second single mode core and the transmission output part, the second taper core being connected to the second single mode core and the transmission output part. In addition, the optical communication devices may further include: a third single mode core to which the optical signal via the reflection output part is outputted; and a third taper core disposed between the third single mode core and the reflection output part, the third taper core being connected to the third single mode core and the reflection output part.

In further embodiments, the optical input part, the transmission output part, and the reflection output part may operate in multi-mode.

In still further embodiments, the optical input part, the transmission output part, and the reflection output part may be formed of polymer.

In even further embodiments, the main core, the heater, and the reflection output part may be included in one optical switch, and a plurality of the optical switches may be disposed on the substrate. The plurality of the optical switches may be connected to each other in series. At this time, the transmission output part in one of a pair of the optical switches adjacent to each other may be connected to the optical input part in the other of the pair of the optical switches.

In yet further embodiments, the optical communication devices may further includes an optical attenuator seriously connected to an optical switch of an end of the optical switches connected to each other in series. The transmission output part of the optical switch of the one end may be optically connected to an input part of the optical attenuator.

In yet further embodiments, the optical attenuator may include: an attenuator-core extending in one direction, the attenuator-core comprising an input part and an output part; an attenuator-cladding surrounding the attenuator-core; and an attenuator-heater crossing the attenuator-core. The attenuator-cladding may be disposed between the attenuator-heater and the attenuator-core.

In yet further embodiments, the attenuator-heater of the optical attenuator may operate when the heater in one of the plurality of the optical switches operates.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Since preferred embodiments are provided below, the order of the reference numerals given in the description is not limited thereto. In the figures, the dimensions of layers and regions are exaggerated for clarity of illustration. It will also be understood that when a layer (or film) is referred to as being 'on' another layer or substrate, it can be directly on the other layer or substrate, or intervening layers may also be present. The word 'and/or' means that one or more or a combination of relevant constituent elements is possible. Like reference numerals refer to like elements throughout.

Embodiment

Figure 1:
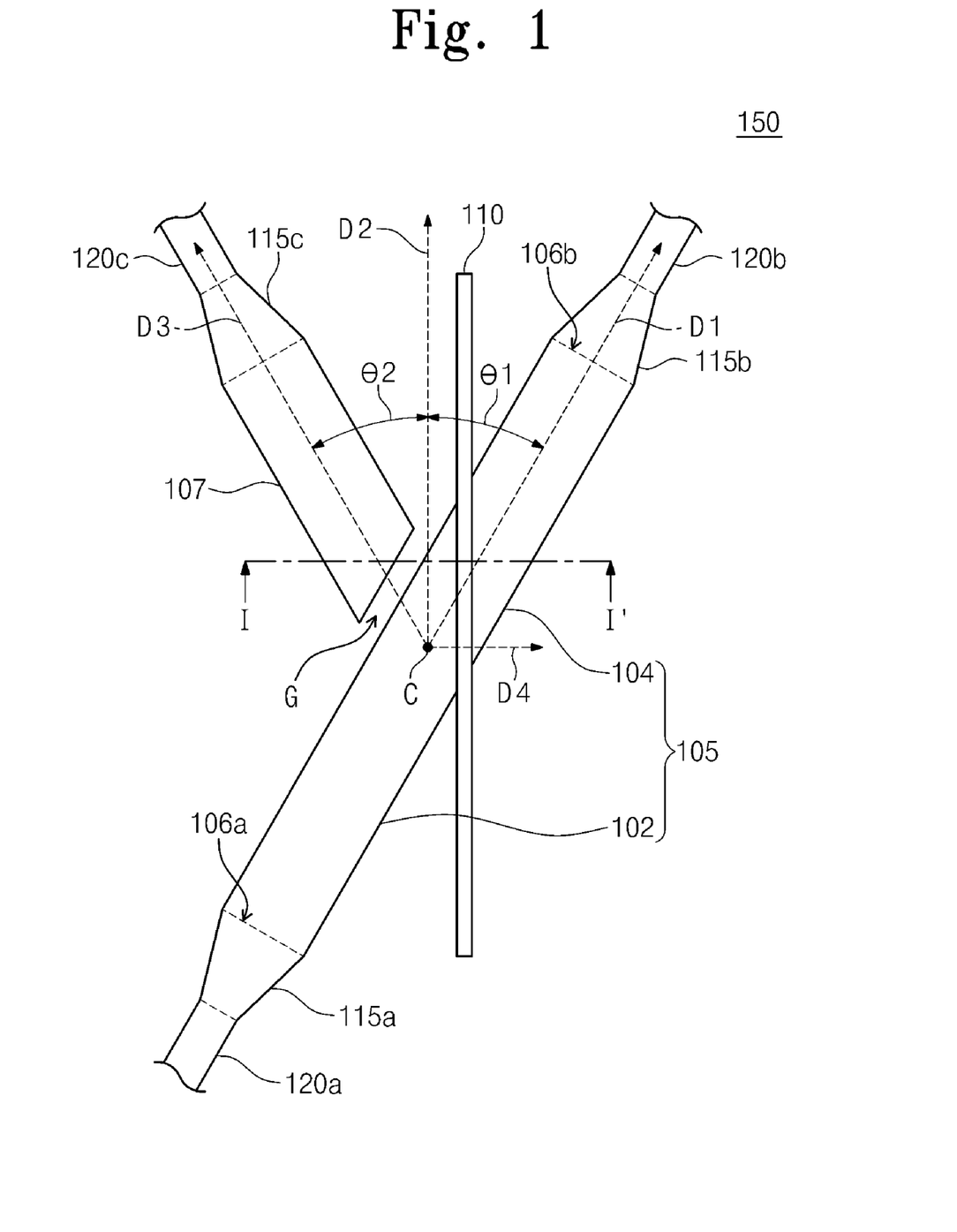
FIG. 1 is a plan view of an optical communication device including an optical switch according to an embodiment of the present invention.
Figure 2:
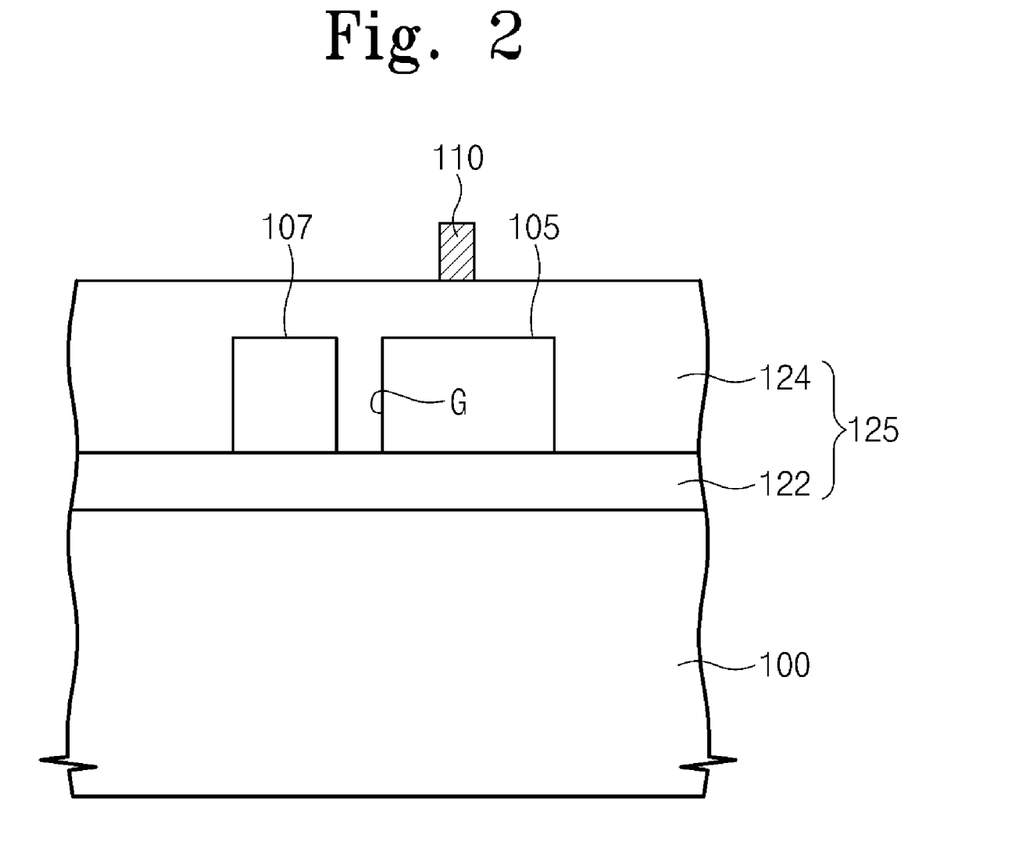
FIG. 2 is a cross-sectional view taken along line I-I' of FIG. 1.

FIG. 1 is a plan view of an optical communication device including an optical switch according to an embodiment of the present invention, and FIG. 2 is a cross-sectional view taken along line I-I' of FIG. 1.

Referring to FIGS. 1 and 2, an optical communication device according to an embodiment of the present invention may include an optical switch 150 disposed on a substrate 100. The optical switch 150 may include a main core 105 extending along a first direction D1, a heater 110 extending along a second direction D2, and a reflection output part 107 extending along a third direction D3. The first, second, and third directions D1, D2, and D3 may be parallel to a top surface of the substrate 100. The first, second, and third directions D1, D2, and D3 have directions different from each other.

The optical switch 150 may further include a cladding 125 surrounding the main core 105 and the reflection output part 107. The cladding 125 surrounds a bottom surface, lateral surfaces, and a top surface of the main core 105. Similarly, the cladding 125 surrounds a bottom surface, lateral surfaces, and a top surface of the reflection output part 107. The cladding 125 may include a lower cladding 122 and an upper cladding 124. The lower cladding 122 may be disposed between the main core 105 and the substrate 100 and between the reflection output part 107 and the substrate 100. That is, the lower cladding 122 may cover the bottom surfaces of the main core 105 and the reflection output part 107. The lower cladding 122 may be disposed on an entire surface of the substrate 100 or a portion of the substrate 100. The upper cladding 124 may be disposed on the lateral surfaces and the top surface of the main core 105 and the lateral surfaces and the top surface of the reflection output part 107. The lower and upper claddings 122 and 124 may be formed of the same material. The cladding 125 may be formed of a material having a refractive index lower than those of the main core 105 and the reflection output part 107.

The main core 105 includes an optical input part 102 and a transmission output part 104 sequentially arranged along the first direction D1. The main core 105 may have a first end 106a, a second end 106b, and a central point C. The optical input part 102 may correspond to a portion of the main core 105 between the central point C and the first end 106a. The transmission output part 104 may correspond to the other portion of the main core 105 between the central point C and the second end 106b. That is, the optical input part 102 and the transmission output part 104 may be connected to each other at the central point C. The optical input part 102 may have the same width as the transmission output part 104. The optical input part 102 may have a width (i.e., a width of the main core 105) ranging from about 25 μm to 40 μm.

The heater 110 extends along the second direction D2 to cross the main core 105. The cladding 125 may be disposed between the main core 105 and the heater 110. For example, the upper cladding 124 may be disposed between the main core 105 and the heater 110. The heater 110 may partially supply heat to the main core 105. That is, the main core 105 may include a first portion receiving the heat of the heater 110 and a second portion that does not receive the heat of the heater 110. An angle between the first direction D1 and the second direction D2 is defined as a first angle $\ominus 1$. The first angle $\ominus 1$ is greater than 0° and less than 90°. Particularly, the first angle $\ominus 1$ may range from about 3° to about 6°.

The reflection output part 107 extends along the third direction D3 from the central point C of the main core 105. An angle between the second direction D2 and the third direction D3 is defined as a second angle $\ominus 2$. The second angle $\ominus 2$ may be equal to the first angle $\ominus 1$. That is, the reflection output part 107 and the transmission output part 104 may be symmetrical to each other with respect to a virtual-straight line passing through the central point C and extending toward the second direction D2. Since the second angle $\ominus 2$ may be equal to the first angle $\ominus 1$, the second angle $\ominus 2$ is also greater than 0° and less than 90°. Particularly, the second angle $\ominus 2$ may range from about 3° to about 6°. Thus, an angle between the first and third directions D1 and D3 may range from about 6° to about 12°. The reflection output part 107 may have the same width as the main core 105.

The main core 105 and the reflection output part 107 may be formed of a material having a refractive index higher than that of the cladding 125. The main core 105 may be formed of a material having a different refractive index when subjected to heat. The main core 105 and the reflection output part 107 may be formed of the same material. For example, the main core 105 and the reflection output part 107 may be formed of polymer. The main core 105 and the reflection output part 107 may operate in multi-mode.

The reflection output part 107 may be spaced from the main core 105. A gap region G between the reflection output part 107 and the main core 105 may be filled with the cladding 125. However, the present invention is not limited thereto. According to an embodiment of the present invention, the reflection output part 107 may be in contact with the main core 105.

The heater 110 may be moved from the central point C along a fourth direction D4. The fourth direction D4 is perpendicular to the second direction D2, and is a direction away from the reflection output part 107. More specifically, the heater 110 may be moved along the fourth direction D4 to offset from the virtual-straight line passing through the central point C and extending toward the second direction D2. However, the present invention is not limited thereto. According to an embodiment of the present invention, the heater 110 may pass through the central point C.

The optical switch 150 may further include a first taper core 115a, a second taper core 115b, and a third taper core 115c. Also, the optical switch 150 may further include a first single mode core 120a, a second single mode core 120b, and a third single mode core 120c. An optical signal may be inputted into the optical input part 102 through the first single mode core 120a. The optical signal via the transmission output part 104 may be outputted through the second single mode core 120b. The optical signal via the reflection output part 107 may be outputted through the third single mode core 120c.

The first taper core 115a may be disposed between the first single mode core 120a and the optical input part 102. The first taper core 115a has a first end connected to the optical input part 102 and a second end connected to the first single mode core 120a. The optical input part 102 may have a width greater than that of the first single mode core 120a. The first end of the first taper core 115a connected to the optical input part 102 may have a width greater than that of the second end of the first taper core 115a connected to the first single mode core 120a. As a position is moved from the first end of the first taper core 115a to the second end of the first taper core 115a, the width of the first taper core 115a may be gradually decrease. The first taper core 115a may adiabatically connect the first single mode core 120a to the optical input part 102.

Similarly, the second taper core 115b may be disposed between the second single mode core 120b and the transmission output part 104 and be connected to the second single mode core 120b and the transmission output part 104. The transmission output part 104 may have a width greater than that of the second single mode core 120b. As a position is moved from the transmission output part 104 to the second single mode core 120b, the width of the second taper core 115b may be gradually decrease. The second taper core 115b may adiabatically connect the second single mode core 120b to the transmission output part 104. The third taper core 115c may be disposed between the third single mode core 120c and the reflection output part 107 and be connected to the third single mode core 120c and the reflection output part 107. The reflection output part 107 may have a width greater than that of the third single mode core 120c. As a position is moved from the reflection output part 107 to the third single mode core 120c, the width of the third taper core 115c may be gradually decrease. The third taper core 115c may adiabatically connect the third single mode core 120c to the reflection output part 107.

The taper cores 115a, 115b, and 115c and the single mode cores 120a, 120b, and 120c may be surrounded by the cladding 125. That is, the cladding 125 may surround bottom surfaces, lateral surfaces, and top surfaces of the taper cores 115a, 115b, and 115c and the single mode cores 120a, 120b, and 120c. The taper cores 115a, 115b, and 115c and the single mode cores 120a, 120b, and 120c may be formed of a material having a refractive index higher than that of the cladding 125. For example, the cores 115a, 115b, 115c, 120a, 120b, and 120c may be formed of polymer. The cores 115a, 115b, 115c, 120a, 120b, and 120c may be formed of the same material as the main core 105.

An operation method of the optical communication device including the optical switch 150 having the above-described structure will be described with reference to FIGS. 3 and 4.

Figure 3:
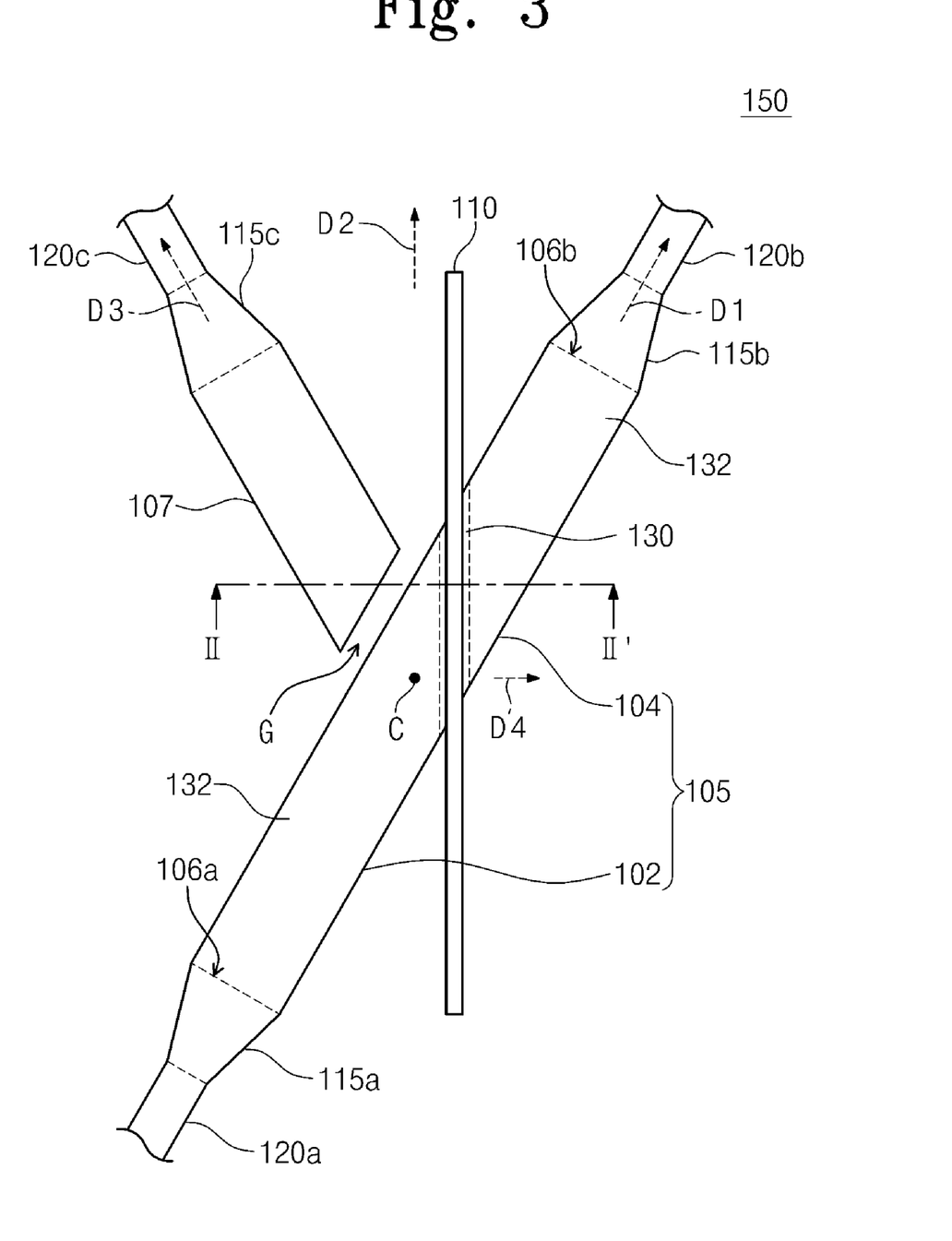
FIG. 3 is a plan view for explaining an operation method of an optical communication device including an optical switch according to an embodiment of the present invention.
Figure 4:
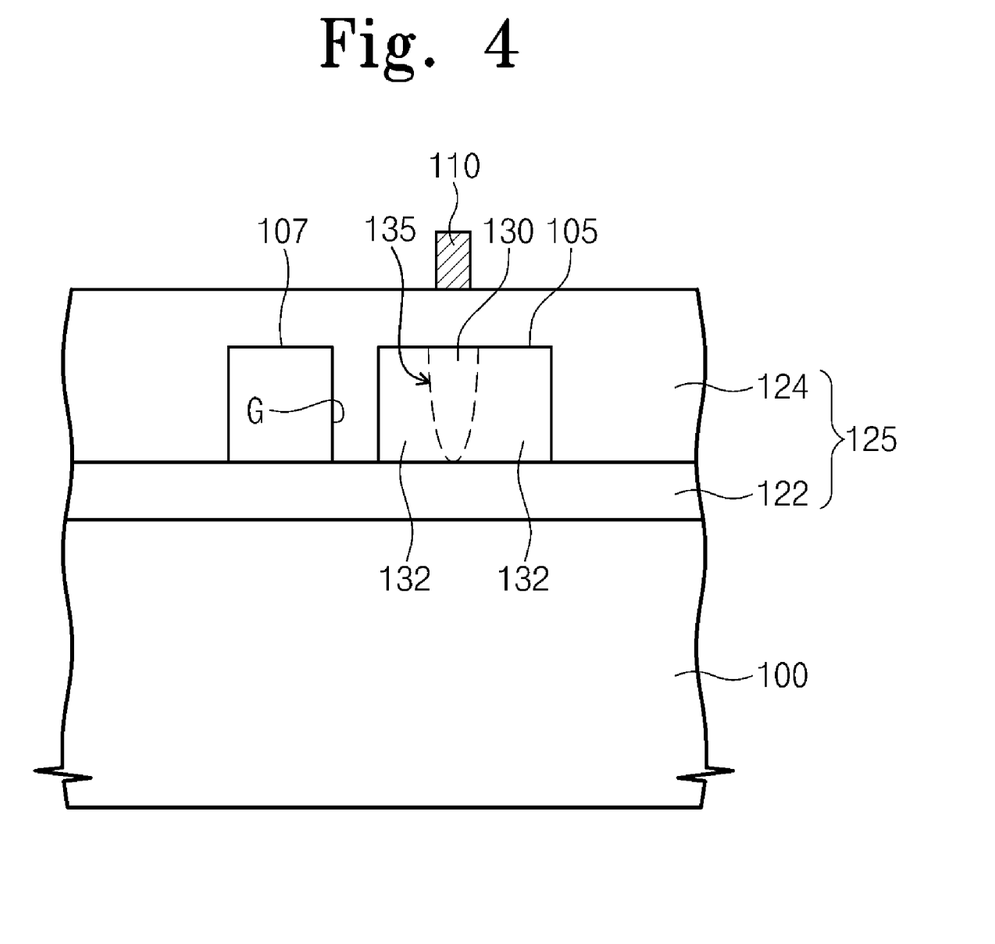
FIG. 4 is a cross-sectional view taken along line II-II' of FIG. 3.

FIG. 3 is a plan view for explaining an operation method of an optical communication device including an optical switch according to an embodiment of the present invention, and FIG. 4 is a cross-sectional view taken along line II-II' of FIG. 3.

Referring to FIGS. 3 and 4, as described above, the main core 105 may include a first portion 130 receiving the heat of the heater 110 and a second portion 132 that does not receive the heat of the heater 110. When the heater 110 operates to supply the heat with the main core 105, the first portion 130 of the main core 105 has a refractive index lower than that of the second portion 132 due to a thermooptic effect. Thus, a reflective surface 135 is generated at a boundary between the first portion 130 and the second portion 132. An optical signal inputted into the optical input part 102 is reflected by the reflective surface 135 and outputted through the reflection output part 107. Since a width of the heater is limited, the first portion 130 of the main core 105 may have nonlinearly inclined lateral surfaces. Thus, the reflective surface 135 generated by the heat of the heater 110 may be nonlinearly inclined.

When the heater 110 does not operate, since the first portion 130 of the main core 105 does not receive the heat, the thermooptic effect does not occur. Thus, the reflective surface 135 disappears. In this case, the optical signal inputted through the optical input part 102 is outputted through the transmission output part 104.

As a result, the optical signal inputted into the optical input part 102 may be outputted to the transmission output part 104 or the reflection output part 107 according to the operation of the heater 110. That is, a path of the optical signal may be changed by the optical switch 150.

As described above, the reflection output part 107 may be spaced from the main core 105. In case where the inputted optical signal is outputted via the transmission output part 104, since the reflection output part 107 is spaced from the main core 105, a loss of the optical signal via the transmission output part 104 may be minimized. Thus, an isolation characteristic of the main core 105 may be improved.

In order to minimize the loss of the optical signal outputted through the reflection output part 107, a distance spaced between the reflection output part 107 and the main core 105 may be optimized. For example, the distance spaced between the reflection output part 107 and the main core 105 may range from about 0.25 µm to about 2 µm.

As described above, the heater 110 may be offset from the central point C along the fourth direction D4, therefore, reflection efficiency of the inputted optical signal may be improved. At this time, an offset distance (i.e., a distance moved from the central point C to the fourth direction D4) of the heater 110 may range from about 3 µm to about 15 µm.

Another Embodiment

This embodiment discloses an optical communication device including a plurality of optical switches that are equal to the optical switch described in the aforementioned embodiment. In this embodiment, the same components as the aforementioned embodiment have the same reference numerals.

Figure 5:
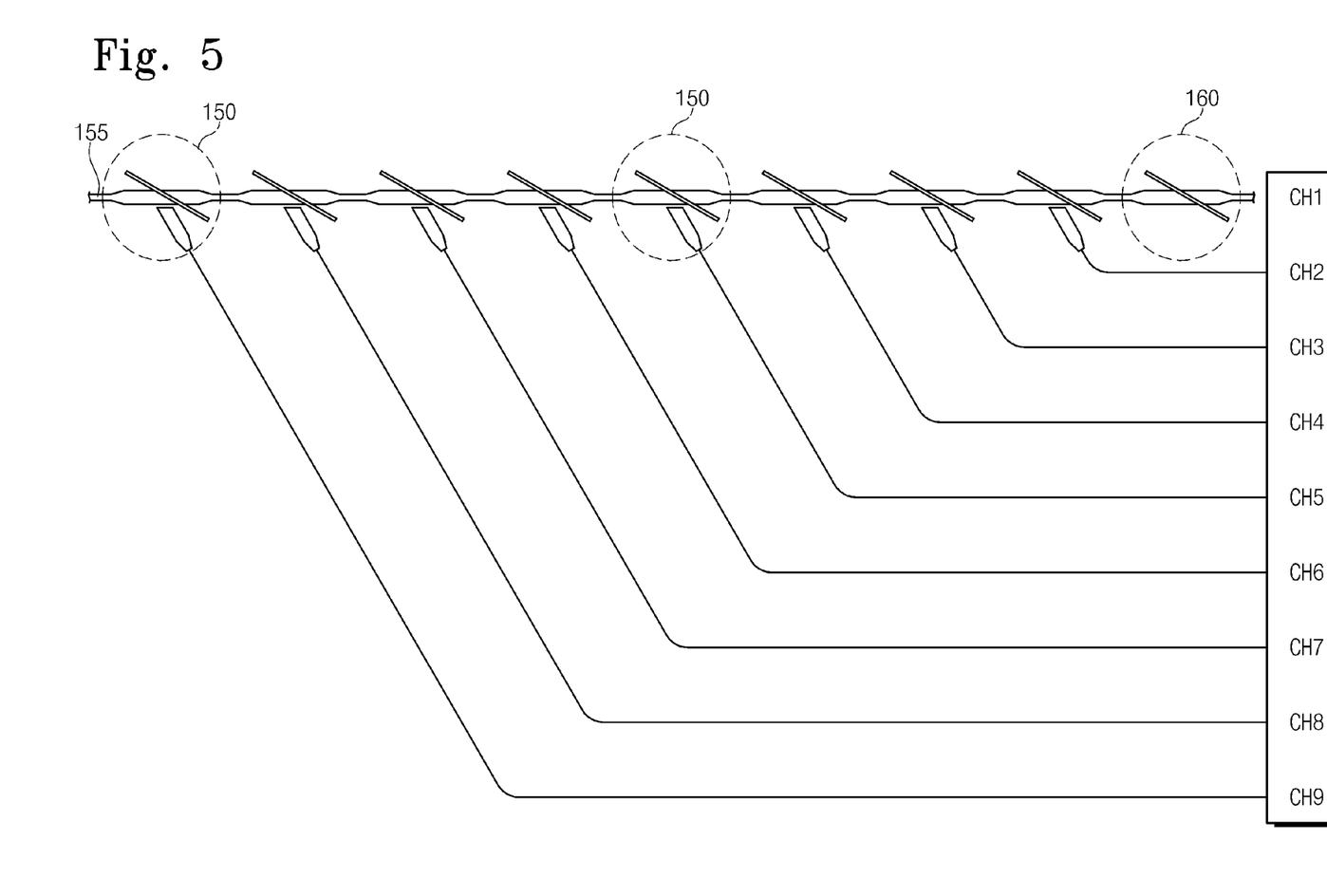
FIG. 5 is a plan view of an optical communication device including optical switches according to another embodiment of the present invention.
Figure 6:
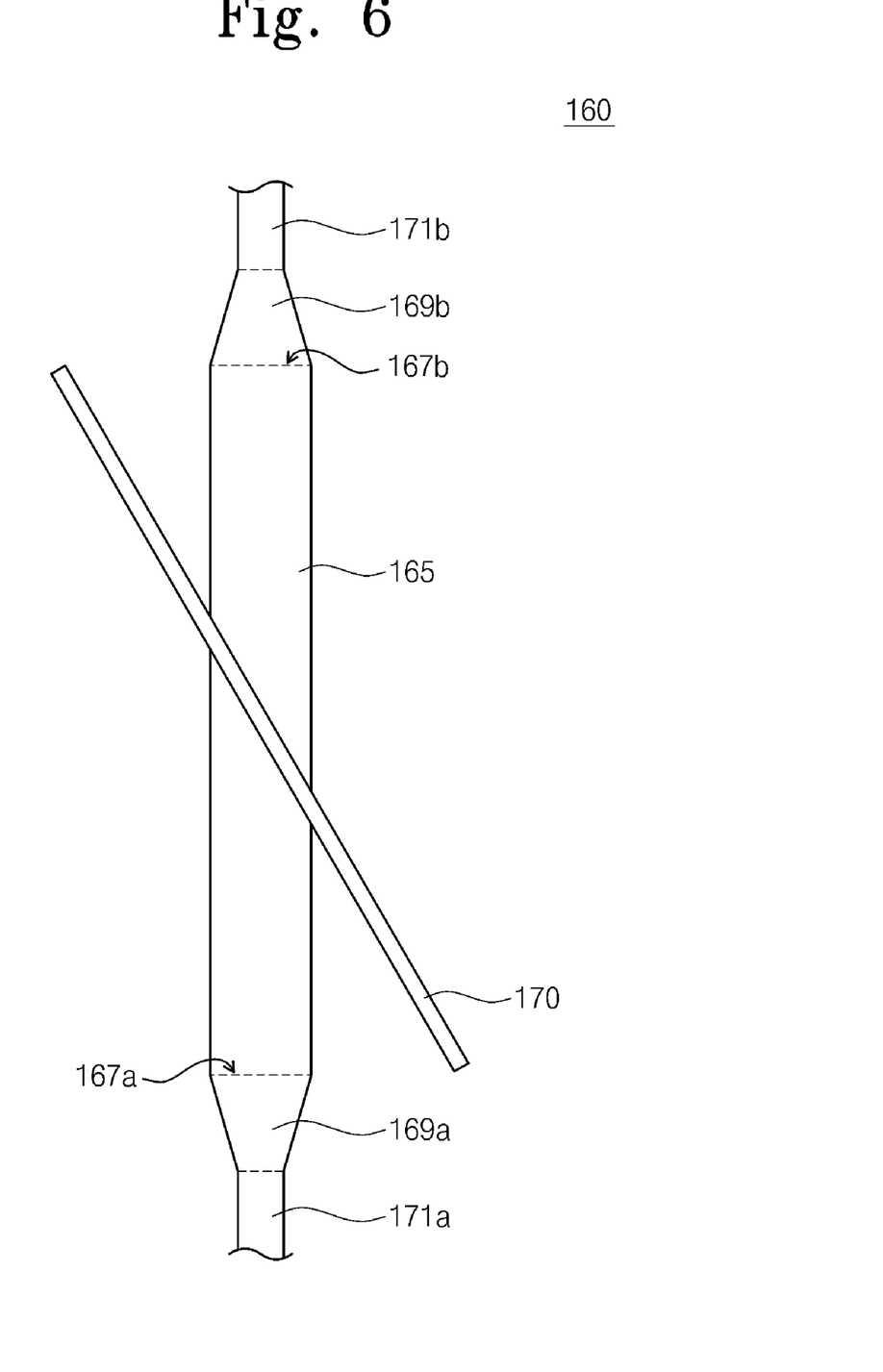
FIG. 6 is a plan view for explaining an optical attenuator of FIG. 5.

FIG. 5 is a plan view of an optical communication device including optical switches according to another embodiment of the present invention, and FIG. 6 is a plan view for explaining an optical attenuator of FIG. 5.

Referring to FIG. 5, an optical communication device includes a plurality of optical switches 150. The plurality of the optical switches 150 may be connected to each other in series. Particularly, a transmission output part in one of a pair of the optical switches 150 adjacent to each other is optically connected to an optical input part in the other of the pair of the optical switches 150. More specifically, a single mode core connected to the transmission output part in one of the pair of the optical switches 150 may be connected to a single mode core connected to the optical input part in the other of the pair of the optical switches 150. Although eight optical switches 150 are seriously connected to each other in FIG. 5, the present invention is not limited thereto. According to another embodiment, the optical communication device may include two or more optical switches 150 connected to each other in series.

The plurality of optical switches 150 may be included in one optical switch group. An optical input part of the optical switch 150 of a first end of the plurality of optical switches 150 may be optically connected to a group input terminal 155. The group input terminal may be a single mode core surrounded by a cladding. The optical switch group may output an optical signal to any one channel of a plurality of channels. At this time, the number of channels through which the optical switch group can output the optical signal may equal to one more than the number of optical switches 150 within the optical switch group. Particularly, output terminals of the optical switch group may include reflection output parts of the optical switches within the optical switch group and a transmission output part of the optical switch 150 of a second end of the plurality of the optical switches 150. For example, in case where the optical switch group includes eight optical switches 150, the optical switch group may output the optical signal to any one of nine channels.

The optical switch group may further include an optical attenuator 160 seriously connected to the optical switch 150 of the second end of the plurality of the optical switches 150. The transmission output part of the optical switch 150 of the second end may be optically connected to an input part of the optical attenuator 160. The optical attenuator 160 will be described in detail with reference to FIG. 6.

FIG. 6 is a plan view for explaining an optical attenuator of FIG. 5.

Referring to FIG. 6, the optical attenuator 160 may include an attenuator-core 165 extending in one direction. The attenuator-core 165 may include an input part and an output part. An attenuator-cladding may surround a top surface, lateral surfaces, and a bottom surface of the attenuator-core 165. An attenuator-heater 170 may cross the attenuator-core 165. The attenuator-heater 170 may be nonparallel and nonperpendicular to the attenuator-core 165. The attenuator-cladding may be disposed between the attenuator-heater 170 and the attenuator-core 165.

The attenuator-core 165 has a first end 167a and a second end 167b. A portion of the attenuator-core 165 having the first end 167a may correspond to the input part, and the other portion of the attenuator-core 165 having the second end 167b may correspond to the output part. A first attenuator-taper core 169a may be disposed between the first end 167a and an input single mode core 171a, and a second attenuator-taper core 169b may be disposed between the second end 167b and an output single mode core 171b. The attenuator-taper cores 169a and 169b and the single mode cores 171a and 171b may be surrounded by the attenuator-cladding. The cores 165, 169a, 169b, 171a, and 171b may be formed of polymer. The attenuator-cladding is formed of a material having a refractive index lower than those of the cores 165, 169a, 169b, 171a, and 171b.

An operation method of the optical attenuator 160 will now be described. When the attenuator-heater 170 operates to supply heat to the attenuator-core 165, a refractive index of a portion of the attenuator-core 165 may be changed. At this time, an optical signal inputted through the input single mode core 171a may be excited to many higher-order modes within the attenuator-core 165 due to refractive index perturbation, and destructive interference of the higher-order modes may be generated while the optical signal passes through the second attenuator-taper core 169b and the output single mode core 171b. As a result, in case where the attenuator-heater 170 operates, the optical attenuator 160 may become an off state. Also, in case where the attenuator-heater 170 does not operate, the optical attenuator 160 may become an on state.

An operation method of the optical communication device including the optical switch group will be described with reference to FIG. 5.

Referring to FIG. 5, in case where a heater of a optical switch 150 selected from the optical switch group operates and heaters of a non-selected optical switches 150 in the optical switch group does not operate, the optical signal inputted through the group input terminal 155 may be outputted through the reflection output part of the selected optical switch 150. For example, in case where the third optical switch 150 from the left is selected in FIG. 5, the inputted optical signal may be outputted to a channel 7 CH7 via a reflection output part of the third optical switch 150. In case where all optical switches 150 (i,e, heaters) in the optical switch group do not operate, the inputted optical signal may be outputted to a channel 1 CH1.

In case where the optical attenuator 160 exists, a loss of the inputted optical signal can be reduced. Particularly, the selected optical switch 150 and the optical attenuator 160 may operate at the same time. In this case, since the optical attenuator 160 becomes an off state, an isolation characteristic of the selected optical switch 150 may be improved. In case where all optical switches 150 in the optical switch group do not operate, the optical attenuator 160 may not operate also. Thus, the optical signal may be outputted to the channel 1 CH1.

The attenuator-heater 170 of the optical attenuator 160 and the heaters of the optical switches 150 may independently operate. Thus, various characteristics of the optical communication device may be improved. For example, a circuit configuration and/or a manufacturing process of the optical communication device may be simplified. Therefore, productivity of the optical communication device may be improved. In addition, a temperature of the heat of the attenuator-heater 170 of the optical attenuator 160 may be freely adjusted according to required characteristics.

As described above, the optical communication device according to the embodiments of the present invention include the transmission output part and the reflection output part. Thus, the optical signal inputted through the optical input part can be any one of the reflection output part and the transmission output part. Therefore, the optical switch according to the embodiments of the present invention can change the path of the optical signal.

In addition, according to the operation of the heater, the reflective surface may be generated or disappeared within the main core including the optical input part and the transmission output part. Thus, according to the operation of the heater, the optical signal can be outputted to any one of the reflection output part and the transmission output part.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical communication device provided with digital optical switching, comprising:
    a substrate; and
    at least one optical switch including a first optical switch comprised of:
       a main core disposed on the substrate and extending along a first direction, the main core having a central point and comprising an optical input part and a transmission output part sequentially arranged along the first direction;
       a heater extending along a second direction to cross the main core; and
       a reflection output part extending along a third direction from the central point of the main core,
    wherein the first direction and the second direction define a first angle there between, the second direction and the third direction define a second angle there between, and the first angle is equal to the second angle, and
    wherein all portions of the heater are spaced from the central point of the main core along a fourth direction that is perpendicular to the second direction and that is positioned away from the reflection output part.

2. The optical communication device of claim 1, wherein, when heat is supplied by the heater, the main core comprises a first portion that receives the heat and a second portion that does not receive the heat, wherein the first portion has a refractive index that is lower than that of the second portion, and wherein a reflective surface parallel to the second direction is generated at a boundary between the first portion and the second portion.

3. The optical communication device of claim 2, wherein, when the heater does not operate to supply heat, the first portion of the main core has the same refractive index as the second portion of the main core.

4. The optical communication device of claim 1, wherein the reflection output part is spaced apart from the main core.

5. The optical communication device of claim 1, further comprising a cladding surrounding the main core and the reflection output part, the cladding being disposed between the heater and the main core.

6. The optical communication device of claim 1, wherein respective ones of the at least one optical switch further comprise:
    a first single mode core in which an optical signal is incident;
    a first taper core disposed between the first single mode core and the optical input part, the first taper core being connected to the first single mode core and the optical input part;
    a second single mode core to which an optical signal via the transmission output part is outputted; and
    a second taper core disposed between the second single mode core and the transmission output part, the second taper core being connected to the second single mode core and the transmission output part
    wherein both the first taper core and the second taper core have a linear taper shape.

7. The optical communication device of claim 6, wherein respective ones of the at least one optical switch further comprise:
    a third single mode core to which the optical signal via the reflection output part is outputted; and
    a third taper core disposed between the third single mode core and the reflection output part, the third taper core being connected to the third single mode core and the reflection output part
    wherein the third taper core has a linear taper shape, and wherein the reflection output part, the third taper core, and the third single mode are sequentially arranged in the third direction.

8. The optical communication device of claim 6, wherein the optical input part, the transmission output part, and the reflection output part of respective ones of the at least one optical switch operate in multi-mode.

9. The optical communication device of claim 8, wherein the optical input part, the transmission output part, and the reflection output part of the at least one optical switch are formed of a polymer.

10. The optical communication device of claim 8, wherein the main core, the heater, and the reflection output part are included in the first optical switch, and the at least one optical switch is a plurality of optical switches that are disposed on the substrate.

11. The optical communication device of claim 10, wherein the plurality of optical switches are connected to each other in series, and wherein the transmission output part in one of a pair of optical switches of the plurality of optical switches that are positioned adjacent to each other is connected to the optical input part in another of the pair of optical switches of the plurality of optical switches.

12. The optical communication device of claim 1, further comprising an optical attenuator connected in series to an optical switch on one end of the plurality of optical switches, wherein the transmission output part of the optical switch on of the one end is optically connected to an input part of the optical attenuator.

13. The optical communication device of claim 12, wherein the optical attenuator comprises:
    an attenuator-core extending in one direction, the attenuator-core comprising:
       an input part and an output part;
       an attenuator-cladding surrounding the attenuator-core; and
       an attenuator-heater crossing the attenuator-core,
    wherein the attenuator-cladding is disposed between the attenuator-heater and the attenuator-core.

14. The optical communication device of claim 13, wherein the attenuator-heater of the optical attenuator operates when the heater in one of the plurality of the optical switches operates.

* * * * *